US008801862B2

(12) United States Patent
Graven

(10) Patent No.: US 8,801,862 B2
(45) Date of Patent: Aug. 12, 2014

(54) DISHWASHER AUTO HOT START AND DSM

(75) Inventor: Erick Paul Graven, Louisville, KY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/891,070

(22) Filed: Sep. 27, 2010

(65) Prior Publication Data
US 2012/0073603 A1 Mar. 29, 2012

(51) Int. Cl.
B08B 7/04 (2006.01)
B08B 9/20 (2006.01)
G05D 3/12 (2006.01)
A47L 15/00 (2006.01)

(52) U.S. Cl.
CPC ......... *A47L 15/0047* (2013.01); *A47L 2501/34* (2013.01); *A47L 2501/28* (2013.01); *A47L 2401/30* (2013.01); *A47L 2401/12* (2013.01); *A47L 2501/36* (2013.01); *A47L 2501/02* (2013.01); *A47L 2301/08* (2013.01)
USPC ............ 134/18; 134/25.2; 700/295; 700/296; 700/297

(58) Field of Classification Search
USPC ............ 134/18, 25.2; 700/295, 296, 297, 299
See application file for complete search history.

(56) References Cited

U.S. PATENT DOCUMENTS

| 2,545,054 A | 3/1951 | Stitz |
| 3,683,343 A | 8/1972 | Feldman et al. |
| 3,720,073 A | 3/1973 | McCarty |
| 4,048,812 A | 9/1977 | Thomason |
| 4,167,786 A | 9/1979 | Miller et al. |
| 4,190,756 A | 2/1980 | Foerstner |
| 4,216,658 A | 8/1980 | Baker et al. |
| 4,247,786 A | 1/1981 | Hedges |
| 4,362,970 A | 12/1982 | Grady |
| 4,454,509 A | 6/1984 | Buennagel et al. |

(Continued)

FOREIGN PATENT DOCUMENTS

| CN | 1692317 A | 11/2005 |
| CN | 101013979 A | 8/2007 |

(Continued)

OTHER PUBLICATIONS

PCT/US2009/056894 International Search Report.

(Continued)

*Primary Examiner* — Saeed T Chaudhry
(74) *Attorney, Agent, or Firm* — Global Patent Operation; Marc A. Vivenzio

(57) ABSTRACT

A dishwasher is provided comprising one or more power consuming functions and a controller in signal communication with an associated utility. The controller can receive and process a signal from the associated utility indicative of current cost of supplied energy. The controller operates the dishwasher in one of a normal operating mode and an energy savings mode based on the received signal. The controller is configured to change the power consuming functions by adjusting one or more of an operation schedule, an operation delay, an operation adjustment, and a selective deactivation of at least one of the one or more power consuming functions to reduce power consumption of the dishwasher in the energy savings mode. The controller may modify or disable the hot start feature either prior to a wash cycle, or at an early stage of the first prewash cycle, including if a consumer elects to override the prompted energy savings mode.

8 Claims, 5 Drawing Sheets

(56) References Cited

U.S. PATENT DOCUMENTS

| | | |
|---|---|---|
| 4,637,219 A | 1/1987 | Grose |
| 4,659,943 A | 4/1987 | Virant |
| 4,718,403 A | 1/1988 | McCall |
| 4,731,547 A | 3/1988 | Alenduff et al. |
| 4,841,281 A | 6/1989 | Melvin, Jr. |
| 4,903,502 A | 2/1990 | Hanson et al. |
| 4,926,837 A | 5/1990 | Parker et al. |
| 4,998,024 A | 3/1991 | Kirk et al. |
| 5,040,724 A | 8/1991 | Brinkruff et al. |
| 5,137,041 A * | 8/1992 | Hall ............................ 134/57 D |
| 5,183,998 A | 2/1993 | Hoffman et al. |
| 5,220,807 A | 6/1993 | Bourne et al. |
| 5,224,355 A | 7/1993 | So et al. |
| 5,230,467 A | 7/1993 | Kubsch et al. |
| 5,289,362 A | 2/1994 | Liebl et al. |
| 5,408,578 A | 4/1995 | Bolivar |
| 5,430,430 A | 7/1995 | Gilbert |
| 5,451,843 A | 9/1995 | Kahn et al. |
| 5,462,225 A | 10/1995 | Massara et al. |
| 5,479,157 A | 12/1995 | Suman et al. |
| 5,479,558 A | 12/1995 | White et al. |
| 5,481,140 A | 1/1996 | Maruyama et al. |
| 5,488,565 A | 1/1996 | Kennon et al. |
| 5,495,551 A | 2/1996 | Robinson et al. |
| 5,504,306 A | 4/1996 | Russell et al. |
| 5,505,377 A | 4/1996 | Weiss |
| 5,515,692 A | 5/1996 | Sterber et al. |
| 5,574,979 A | 11/1996 | West |
| 5,581,132 A | 12/1996 | Chadwick |
| 5,635,895 A | 6/1997 | Murr |
| 5,706,191 A | 1/1998 | Bassett et al. |
| 5,761,083 A | 6/1998 | Brown et al. |
| 5,805,856 A | 9/1998 | Hanson |
| 5,816,491 A | 10/1998 | Berkeley et al. |
| 5,866,880 A | 2/1999 | Seitz et al. |
| 5,874,902 A | 2/1999 | Heinrich et al. |
| 5,880,536 A | 3/1999 | Mardirossian |
| 5,883,802 A | 3/1999 | Harris |
| 5,886,647 A | 3/1999 | Badger et al. |
| 5,926,776 A | 7/1999 | Glorioso et al. |
| 5,937,942 A | 8/1999 | Bias et al. |
| 5,956,462 A | 9/1999 | Langford |
| 6,018,150 A | 1/2000 | Maher |
| 6,026,651 A | 2/2000 | Sandelman |
| 6,080,971 A | 6/2000 | Seitz |
| 6,118,099 A | 9/2000 | Lake |
| 6,144,161 A | 11/2000 | Kimmich et al. |
| 6,179,213 B1 | 1/2001 | Gibino et al. |
| 6,185,483 B1 | 2/2001 | Drees |
| 6,229,433 B1 | 5/2001 | Rye et al. |
| 6,246,831 B1 | 6/2001 | Seitz et al. |
| 6,380,866 B1 | 4/2002 | Sizer et al. |
| 6,400,103 B1 | 6/2002 | Adamson |
| 6,480,753 B1 | 11/2002 | Calder et al. |
| 6,489,597 B1 | 12/2002 | Hornung |
| 6,553,595 B1 | 4/2003 | Bruntz et al. |
| 6,631,622 B1 | 10/2003 | Ghent et al. |
| 6,694,753 B1 | 2/2004 | Lanz et al. |
| 6,694,927 B1 | 2/2004 | Pouchak et al. |
| 6,704,401 B2 | 3/2004 | Piepho et al. |
| 6,778,868 B2 | 8/2004 | Imamura et al. |
| 6,784,872 B1 | 8/2004 | Matsui et al. |
| 6,806,446 B1 | 10/2004 | Neale |
| 6,817,195 B2 | 11/2004 | Rafalovich et al. |
| 6,828,695 B1 | 12/2004 | Hansen |
| 6,860,431 B2 | 3/2005 | Jayadev |
| 6,872,919 B2 | 3/2005 | Wakefield et al. |
| 6,873,876 B1 | 3/2005 | Aisa |
| 6,879,059 B2 | 4/2005 | Sleva |
| 6,904,385 B1 | 6/2005 | Budike |
| 6,922,598 B2 | 7/2005 | Lim et al. |
| 6,943,321 B2 | 9/2005 | Carbone et al. |
| 6,961,642 B2 | 11/2005 | Horst |
| 6,983,210 B2 | 1/2006 | Matsubayashi et al. |
| 7,010,363 B2 | 3/2006 | Donnelly et al. |
| 7,039,575 B2 | 5/2006 | Juneau |
| 7,043,380 B2 | 5/2006 | Rodenberg et al. |
| 7,053,790 B2 | 5/2006 | Jang et al. |
| 7,057,140 B2 | 6/2006 | Pittman |
| 7,069,090 B2 | 6/2006 | Huffington et al. |
| 7,082,380 B2 | 7/2006 | Wiebe et al. |
| 7,110,832 B2 | 9/2006 | Ghent |
| 7,155,305 B2 | 12/2006 | Hayes et al. |
| 7,164,851 B2 | 1/2007 | Sturm et al. |
| 7,206,670 B2 | 4/2007 | Pimputkar et al. |
| 7,266,962 B2 | 9/2007 | Montuoro et al. |
| 7,274,973 B2 | 9/2007 | Nichols et al. |
| 7,274,975 B2 | 9/2007 | Miller et al. |
| 7,368,686 B2 | 5/2008 | Etheredge et al. |
| 7,372,002 B2 | 5/2008 | Nakamura et al. |
| 7,420,140 B2 | 9/2008 | Lenhart et al. |
| 7,420,293 B2 | 9/2008 | Donnelly et al. |
| 7,446,646 B2 | 11/2008 | Huomo |
| 7,478,070 B2 | 1/2009 | Fukui et al. |
| 7,541,941 B2 | 6/2009 | Bogolea et al. |
| 7,561,977 B2 | 7/2009 | Horst et al. |
| 7,565,813 B2 | 7/2009 | Pouchak |
| 7,685,849 B2 | 3/2010 | Worthington |
| 7,720,035 B2 | 5/2010 | Oh et al. |
| 7,751,339 B2 | 7/2010 | Melton et al. |
| 7,783,390 B2 | 8/2010 | Miller |
| 7,919,729 B2 | 4/2011 | Hsu |
| 7,925,388 B2 | 4/2011 | Ying |
| 7,962,248 B2 | 6/2011 | Flohr |
| 7,991,513 B2 | 8/2011 | Pitt |
| 8,024,073 B2 | 9/2011 | Imes et al. |
| 8,027,752 B2 | 9/2011 | Castaldo et al. |
| 8,033,686 B2 | 10/2011 | Recker et al. |
| 8,094,037 B2 | 1/2012 | Unger |
| 8,185,252 B2 | 5/2012 | Besore |
| 8,190,302 B2 | 5/2012 | Burt et al. |
| 8,355,748 B2 | 1/2013 | Abe et al. |
| 8,367,984 B2 | 2/2013 | Besore et al. |
| 2001/0025349 A1 | 9/2001 | Sharood et al. |
| 2001/0048361 A1 | 12/2001 | Mays et al. |
| 2002/0024332 A1 | 2/2002 | Gardner |
| 2002/0071689 A1 | 6/2002 | Miyamoto |
| 2002/0125246 A1 | 9/2002 | Cho et al. |
| 2002/0175806 A1 | 11/2002 | Marneweck et al. |
| 2002/0196124 A1 | 12/2002 | Howard et al. |
| 2002/0198629 A1 | 12/2002 | Ellis |
| 2003/0036820 A1 | 2/2003 | Yellepeddy et al. |
| 2003/0043845 A1 | 3/2003 | Lim et al. |
| 2003/0178894 A1 | 9/2003 | Ghent |
| 2003/0193405 A1 | 10/2003 | Hunt et al. |
| 2003/0194979 A1 | 10/2003 | Richards et al. |
| 2003/0233201 A1 | 12/2003 | Horst et al. |
| 2004/0024483 A1 | 2/2004 | Holcombe |
| 2004/0034484 A1 | 2/2004 | Solomita et al. |
| 2004/0098171 A1 | 5/2004 | Horst |
| 2004/0100199 A1 | 5/2004 | Yang |
| 2004/0107510 A1 | 6/2004 | Buckroyd et al. |
| 2004/0112070 A1 | 6/2004 | Schanin |
| 2004/0117330 A1 | 6/2004 | Ehlers et al. |
| 2004/0118008 A1 | 6/2004 | Jeong et al. |
| 2004/0128266 A1 | 7/2004 | Yellepeddy et al. |
| 2004/0133314 A1 | 7/2004 | Ehlers et al. |
| 2004/0139038 A1 | 7/2004 | Ehlers et al. |
| 2004/0254654 A1 * | 12/2004 | Donnelly et al. ............... 700/22 |
| 2005/0011205 A1 | 1/2005 | Holmes et al. |
| 2005/0134469 A1 | 6/2005 | Odorcic et al. |
| 2005/0138929 A1 | 6/2005 | Enis et al. |
| 2005/0173401 A1 | 8/2005 | Bakanowski et al. |
| 2005/0184046 A1 | 8/2005 | Sterling |
| 2005/0190074 A1 | 9/2005 | Cumeralto et al. |
| 2006/0031180 A1 | 2/2006 | Tamarkin et al. |
| 2006/0036338 A1 | 2/2006 | Harkcom et al. |
| 2006/0068728 A1 | 3/2006 | Ishidoshiro et al. |
| 2006/0095164 A1 | 5/2006 | Donnelly et al. |
| 2006/0123807 A1 | 6/2006 | Sullivan et al. |
| 2006/0159043 A1 | 7/2006 | Delp et al. |
| 2006/0162973 A1 | 7/2006 | Harris et al. |
| 2006/0190139 A1 | 8/2006 | Reaume et al. |
| 2006/0208570 A1 | 9/2006 | Christian et al. |

(56) References Cited

U.S. PATENT DOCUMENTS

| | | |
|---|---|---|
| 2006/0259547 A1 | 11/2006 | Bogatin et al. |
| 2006/0272830 A1 | 12/2006 | Fima et al. |
| 2006/0276938 A1 | 12/2006 | Miller |
| 2006/0289436 A1 | 12/2006 | Carbone et al. |
| 2007/0005195 A1 | 1/2007 | Pasquale et al. |
| 2007/0008076 A1 | 1/2007 | Rodgers et al. |
| 2007/0030116 A1 | 2/2007 | Feher |
| 2007/0043478 A1 | 2/2007 | Ehlers et al. |
| 2007/0136217 A1 | 6/2007 | Johnson et al. |
| 2007/0151311 A1 | 7/2007 | McAllister et al. |
| 2007/0185675 A1 | 8/2007 | Papamichael et al. |
| 2007/0203860 A1 | 8/2007 | Golden et al. |
| 2007/0213880 A1 | 9/2007 | Ehlers |
| 2007/0220907 A1 | 9/2007 | Ehlers |
| 2007/0229236 A1 | 10/2007 | Mercer et al. |
| 2007/0271006 A1 | 11/2007 | Golden et al. |
| 2007/0276547 A1 | 11/2007 | Miller |
| 2008/0029081 A1 | 2/2008 | Gagas et al. |
| 2008/0034768 A1 | 2/2008 | Pimentel et al. |
| 2008/0083729 A1 | 4/2008 | Etheredge et al. |
| 2008/0106147 A1 | 5/2008 | Caggiano et al. |
| 2008/0120790 A1 | 5/2008 | Ashrafzadeh et al. |
| 2008/0122585 A1 | 5/2008 | Castaldo et al. |
| 2008/0136581 A1 | 6/2008 | Heilman et al. |
| 2008/0144550 A1 | 6/2008 | Makhlouf et al. |
| 2008/0167756 A1 | 7/2008 | Golden et al. |
| 2008/0167931 A1 | 7/2008 | Gerstemeier et al. |
| 2008/0172312 A1 | 7/2008 | Synesiou et al. |
| 2008/0177678 A1 | 7/2008 | Di Martini et al. |
| 2008/0179052 A1 | 7/2008 | Kates |
| 2008/0204240 A1 | 8/2008 | Hilgers et al. |
| 2008/0215263 A1 | 9/2008 | Flohr |
| 2008/0258633 A1 | 10/2008 | Voysey |
| 2008/0272934 A1 | 11/2008 | Wang et al. |
| 2008/0277487 A1 | 11/2008 | Mueller et al. |
| 2009/0006878 A1 | 1/2009 | Borghetti et al. |
| 2009/0038369 A1 | 2/2009 | Vondras |
| 2009/0063257 A1 | 3/2009 | Zak et al. |
| 2009/0105888 A1 | 4/2009 | Flohr et al. |
| 2009/0146838 A1 | 6/2009 | Katz |
| 2009/0171862 A1 | 7/2009 | Harrod et al. |
| 2009/0235675 A1 | 9/2009 | Chang et al. |
| 2009/0240381 A1 | 9/2009 | Lane |
| 2009/0254396 A1 | 10/2009 | Metcalfe |
| 2009/0326728 A1 | 12/2009 | Chrisop et al. |
| 2010/0017242 A1 | 1/2010 | Hamilton et al. |
| 2010/0070091 A1 | 3/2010 | Watson et al. |
| 2010/0092625 A1 | 4/2010 | Finch et al. |
| 2010/0131117 A1 | 5/2010 | Mattiocco et al. |
| 2010/0175719 A1* | 7/2010 | Finch et al. ............ 134/18 |
| 2010/0179708 A1 | 7/2010 | Watson et al. |
| 2010/0262963 A1 | 10/2010 | Wassermann et al. |
| 2010/0301774 A1 | 12/2010 | Chemel et al. |
| 2011/0001438 A1 | 1/2011 | Chemel et al. |
| 2011/0062142 A1 | 3/2011 | Steurer |
| 2011/0085287 A1 | 4/2011 | Ebrom et al. |
| 2011/0087382 A1 | 4/2011 | Santacatterina et al. |
| 2011/0095017 A1 | 4/2011 | Steurer |
| 2011/0106328 A1 | 5/2011 | Zhou et al. |
| 2011/0114627 A1 | 5/2011 | Burt |
| 2011/0123179 A1 | 5/2011 | Roetker et al. |
| 2011/0148390 A1 | 6/2011 | Burt et al. |
| 2011/0153106 A1* | 6/2011 | Drake et al. ............ 700/295 |
| 2011/0181114 A1 | 7/2011 | Hodges et al. |
| 2011/0290781 A1 | 12/2011 | Burt et al. |
| 2012/0054123 A1 | 3/2012 | Broniak et al. |

FOREIGN PATENT DOCUMENTS

| | | |
|---|---|---|
| EP | 1496324 A1 | 1/2005 |
| GB | 2105127 A | 3/1983 |
| JP | 11313441 A2 | 11/1999 |
| KR | 20060085711 A | 7/2006 |
| WO | 86/00976 A1 | 2/1986 |
| WO | 90/12261 A1 | 10/1990 |
| WO | 98/48335 A1 | 10/1998 |
| WO | 2007/060059 A1 | 5/2007 |
| WO | 2007136456 A2 | 11/2007 |

OTHER PUBLICATIONS

International Search Report from PCT Application No. PCT/US2009/056878, Nov. 17, 2009.
International Search Report from PCT Application No. PCT/US2009/056882, Nov. 4, 2009.
International Search Report from PCT Application No. PCT/US2009/056883, Oct. 26, 2009.
International Search Report from PCT Application No. PCT/US2009/056886, Nov. 5, 2009.
International Search Report from PCT Application No. PCT/US2009/056889, Nov. 10, 2009.
International Search Report from PCT Application No. PCT/US2009/056911, Mar. 10, 2010.
International Search Report from PCT Application No. PCT/US2009/056895, Nov. 9, 2009.
International Search Report from PCT Application No. PCT/US2009/056901, Nov. 10, 2009.
International Search Report from PCT Application No. PCT/US2009/056906, Nov. 10, 2009.
International Search Report from PCT Application No. PCT/US2009/056913, Nov. 10, 2009.
International Search Report from PCT Application No. PCT/US2009/056914, Nov. 2, 2009.
International Search Report from PCT Application No. PCT/US2009/056919, Nov. 2, 2009.
Search Report from EP Application No. 10153695.1, May 24, 2012.
Real-Time Feedback, Natural Resources Canada via website www.nrcan.gc.ca , 2008, http://oee.nrcan.gc.ca/publications/equipment/10918.
Lemay et al., An Integrated Architecture for Demand Response Communications and Control, University of Illinois Urbana-Champaign, Oct. 28, 2008.
Weisstein, Eric W. "At Least One.", From MathWorld—A Wolfram Web Resource. http://mathworld.wolfram.com/AtLeastOne.html, p. 1.
Search Report from CN Application No. 201010135268.8 dated Oct. 24, 2012.

* cited by examiner

DISHWASHER AUTO HOT START AND DSM

CROSS REFERENCE TO RELATED APPLICATIONS

The present application claims priority from U.S. patent application Ser. No. 12/559,577, filed 15 Sep. 2009 which claims the priority benefit of U.S. Provisional Application Ser. No. 61/097,082, filed 15 Sep. 2009.

BACKGROUND OF THE DISCLOSURE

This disclosure relates to energy management, and more particularly to energy management of household consumer appliances. The disclosure finds particular application in changing existing appliances via add-on features or modules, and incorporating new energy saving features and functions into new appliances.

Currently utilities charge a flat rate or flat cost, but with increasing cost of fuel prices and high energy usage at certain parts of the day, utilities have to buy more energy to supply customers during peak demand. Consequently, utilities are charging higher rates, or structuring higher costs, during peak demand. If peak demand can be lowered, then a potential huge cost savings can be achieved and the peak load that the utility has to accommodate is lessened.

One proposed third party solution is to provide a system where a controller "switches" the actual energy supply to the appliance or control unit on and off. However, there is no active control beyond the mere on/off switching. It is believed that others in the industry cease some operations in an appliance during on-peak time.

Most dishwashers have or will have an automatic hot start feature that automatically occurs at the beginning of a cycle if incoming water temperature is not hot enough to effectively aid in wash performance. If the water temperature on a first fill does not exceed a predetermined temperature, the controller automatically re-runs the fill (i.e., the water is drained from the dishwasher and filled again). Subsequently, the controller then checks the water temperature again to determine if the incoming water meets or exceeds the temperature requirement. The controller will repeat this process up to three times in an effort to purge the incoming hot water line of any residual cold water. A possibility of cold water in the incoming hot water line is particularly evident in homes, for example, where the water line from the hot water heater to the dishwasher is very long, or is in either a crawl space or slab during the cold winter months. As a result of the hot start feature, a user can use up to six gallons of water from the hot water heater, instead of using one and one-half gallons of hot water. These volumes are approximate only. By disabling the auto hot start feature during a high or critical rate period, a consumer or homeowner may save on water and energy usage from the hot water heater during such periods.

Accordingly, a need exists for an improved dishwasher control that in response to elevated operation rates of the energy company, e.g., high or critical rate or demand periods, is operative to selectively disable the auto hot start feature.

SUMMARY OF THE DISCLOSURE

In one aspect of the disclosure, a dishwasher is provided comprising one or more power consuming functions and a controller in communication with an associated utility. The controller can receive and process a signal from the associated utility indicative of current cost of supplied energy. The controller operates the dishwasher in one of a normal operating mode and an energy savings mode based on the received signal. The controller is configured to change the power consuming functions by adjusting one or more of an operation schedule, an operation delay, an operation adjustment, and a selective deactivation of at least one of the one or more power consuming functions to reduce power consumption of the dishwasher in the energy savings mode.

In another aspect of the disclosure, a dishwasher control method is provided comprising: determining the operating or demand state of an associated utility, the state being indicative of a peak demand period or an off-peak demand period, and/or a cost of supplied energy from the associated utility, the cost being indicative of the operating state; operating the dishwasher in a normal mode during the off-peak demand period; operating the dishwasher in an energy savings mode during the peak demand period; scheduling, delaying, adjusting and/or selectively deactivating any number of one or more power consuming features/functions of the dishwasher to reduce power consumption of the dishwasher in the energy savings mode; and, returning to the normal mode after the peak demand period is over.

A dishwasher of an exemplary embodiment includes at least a power consuming feature including a hot start feature at the beginning of a wash cycle. A controller adapted to receive and process a signal indicative of the demand state of the utility supplying energy to the dishwasher and/or the current cost of supplied energy operates the dishwasher in one of a plurality of operating modes. The controller is configured to modify the hot start feature in response to a signal representing the energy savings mode. The typical response of the controller to an energy savings mode signal is to delay operation of the dishwasher until a "critical" or "high" peak demand period has passed. If however, the consumer overrides the delay, the controller in the energy savings mode is configured to modify the hot start feature. If the energy savings mode signal is received before operation of the dishwasher begins and a homeowner inputs an override to the energy savings mode, the controller modifies the hot start feature.

According to a method of controlling the dishwasher, the method includes receiving a signal indicative of a peak demand period, and modifying a hot start feature in response to a homeowner electing to ignore or override the peak demand period signal.

The modifying step may include disabling the hot start feature.

The modifying step may include reducing a target temperature of the hot start feature.

The modifying step may be only responsive if the peak demand signal is received before the beginning of a wash cycle, or alternatively may be responsive if the peak demand signal is received any time prior to completion of the pre-wash cycle.

Another advantage is the ability to control functions and features within the appliance and/or unit at various energy levels, i.e., as opposed to just an on/off function.

Another benefit is the increased flexibility with an associated electrical service provider, and the provision of several modes of operation (not simply an on/off mode).

A primary advantage is minimizing the effect of high rate periods to the consumer.

Another advantage is the ability to adequately address higher than usual water and energy usage during high or critical rate periods.

Still another benefit is associated with minimizing the impact of a hot start feature if a user elects to override the delay.

Still other features and benefits of the present disclosure will become apparent from reading and understanding the following detailed description,

DETAILED DESCRIPTION OF THE PREFERRED EMBODIMENTS

Figure 1:
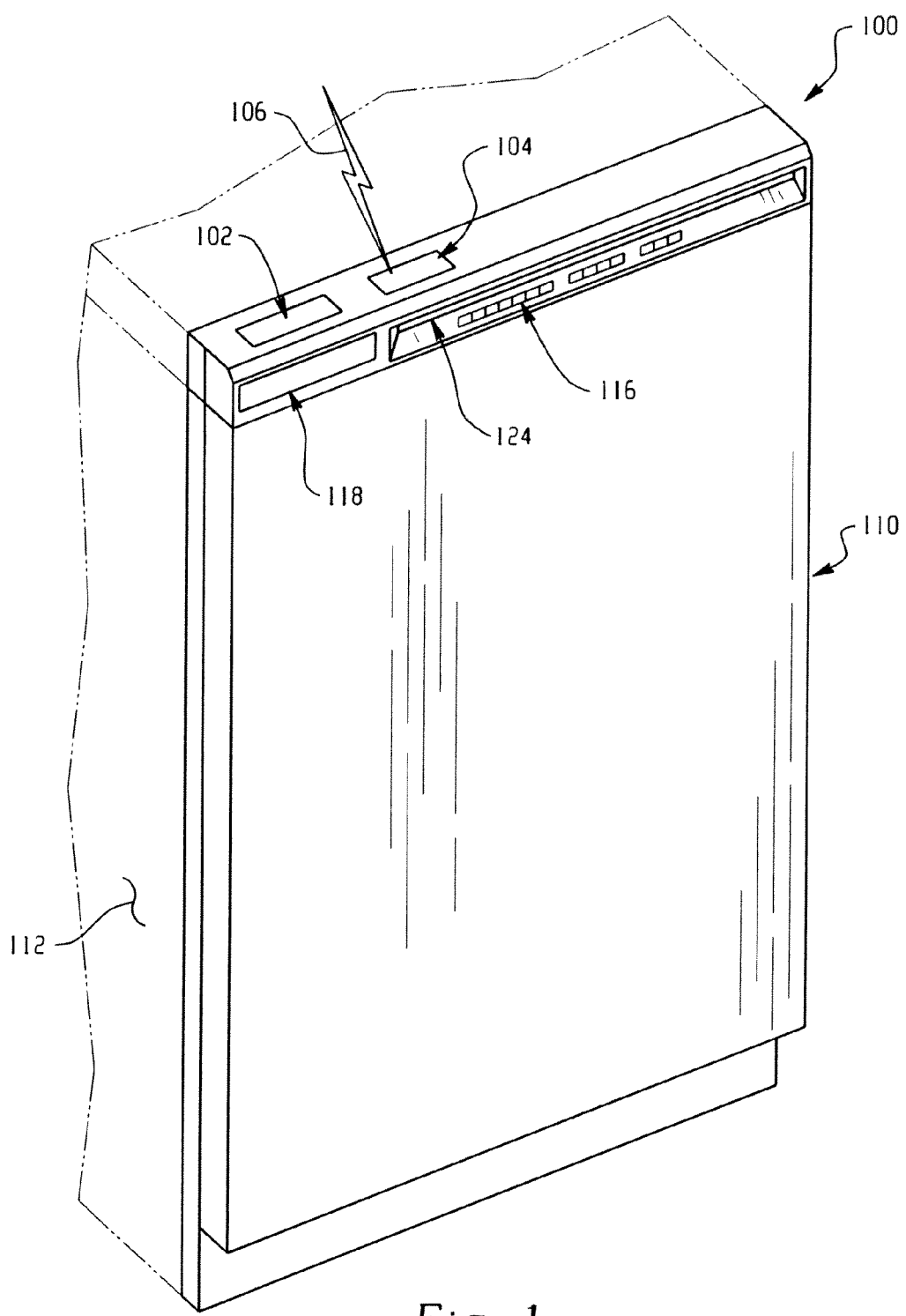
FIG. 1 is a schematic illustration of an exemplary demand managed dishwasher.

An exemplary embodiment of a demand managed appliance 100 is dishwasher 110 illustrated in FIG. 1. The dishwasher 110 comprises at least one power consuming feature/function 102 and a controller 104 operatively associated with the power consuming feature/function. The controller 104 can include a microcomputer or microcontroller on a printed circuit board which is programmed to selectively control the energization of the power consuming feature/function. The controller 104 is configured to receive and process a signal 106 indicative of a utility demand state, for example, availability in terms of high or peak demand and low or off-peak demand, and/or current cost of supplied energy. The energy signal may be generated by a utility provider, such as a power company, and can be transmitted via a power line, as a radio frequency signal, or by any other means for transmitting a signal when the utility provider desires to reduce demand for its resources. The cost can be indicative of the state of the demand for the utility's energy, for example a relatively high price or cost of supplied energy is typically associated with a peak demand state or period and a relatively low price or cost is typically associated with an off-peak demand state or period.

The controller 104 operates the dishwasher 110 in one of a plurality of operating modes, including a normal operating mode and an energy savings mode, in response to the received signal. Specifically, the dishwasher 110 operates in the normal mode in response to a signal indicating an off-peak demand state or period and operates in an energy savings mode in response to a signal indicating a peak demand state or period. As will be discussed in greater detail below, the controller 104 is configured to at least selectively adjust and/or disable the at least one of the power consuming features/functions to reduce power consumption of the dishwasher 110 in the energy savings mode.

The dishwasher 110 generally includes an outer case or housing 112 and a control panel or user interface 116 that operatively interacts with the controller 104 and the power consuming feature/function 102. The dishwasher further includes a door mounted within a door frame. The door sealingly encloses a wash chamber for receiving dishes and/or utensils and the like to be washed. Though not shown in the drawings, the dishwasher includes a conventional water distribution system comprising one or more rotating spray arms for spraying water on the dishes and a motor driven pump for circulating the water through the spray arm(s) during pre-wash, wash and rinse cycles and removing water from the chamber during pump out or drain cycles. Dishwasher 110 also includes a detergent dispensing mechanism and a rinse aid dispensing mechanism. A sheathed electric resistance heater is disposed in the lower region of the wash chamber to heat the interior of the chamber during heated dry cycles. The heater in some embodiments might be used to heat the water such as for sanitization cycles.

The controller is configured to implement a plurality of user selectable operating cycles. Each such operating cycle may comprise a combination of one or more of a pre-wash cycle, a wash cycle, a pump out cycle and a dry cycle, each of which may be of varying duration. The power consuming functions/features of the dishwasher 110 include the pre-wash, wash, rinse and pump out cycles, all of which involve at least energizing the motor that drives the pump, and the heated dry cycles which involve energizing the heating element. The number and types of cycles, and the duration of the cycles, determine the amount of energy consumed by these power consuming features/functions. The control panel 116 can include a display 118 and control buttons for making various operational selections. Dish washing algorithms can be preprogrammed in the memory for many different types of cycles. Instructions and selections are displayed on the display 118, for example, FIG. 3 displays "EP" which is an acronym for "energy pricing". However, one skilled in the art will recognize that other acronyms/terms could be displayed without departing from the scope and intent of the present disclosure. A light source 124 is provided for illuminating the user interface 116.

As described above, appliances can be delayed in their operation, rescheduled for a later start time, and/or altered in their functioning/features in order to reduce energy demands. Some appliances lend themselves to an altered operational schedule to off-peak demand periods due to their functionality. For example, a dishwasher has the capacity to run at off-peak hours because demand on this appliance is either not constant and/or the functions of the dishwasher is such that immediate response is not necessary. As one illustrative example, a dishwasher that has been loaded during the daytime, i.e., on-peak demand period hours, can be programmed to start its operations for a later, albeit off-peak demand hours. It is to be appreciated that on-peak and off-peak demand hours can correspond to high utility costs and relatively low utility costs ($/kilowatt), respectively. In this manner, dishes can be cleaned using energy during the off-peak demand period wherein the subsequently cleaned dishes become available either later in the present day or at a time the following day. As most users can appreciate, particularly for household consumers, immediate cleaning of dishes is many times not necessary.

In order to reduce the peak energy consumed by a dishwasher, modifications and/or delays of individual dishwasher cycles can be adjusted in order to reduce the total energy consumed. Reducing total energy consumed also encompasses reducing the energy consumed at peak times and/or reducing the overall electricity demands during peak times and non-peak times. Electricity demand can be defined as average watts over a short period of time, typically 5-60 minutes.

Changes or adjustments to the dishwasher's scheduled time for which cycles begin can be varied in a number of ways. Delaying or modifying the dishwasher's cycle schedule can be in response to a signal from the controller 104 for the appliance to conserve energy or can be at the user's/consumer's commands. The controller 104 can be in communication with an associated utility where the controller 104 receives and processes a signal from the associated utility indicative of current costs of supplying energy. The appliance controller 104 can be in communication with another appliance, 'master' appliance, or 'master' controller that is in communication with the associated utility. The controller 104 can then operate the dishwasher in one of a normal operating mode and an energy savings mode based on the received signal. The controller 104 can be configured to change the power consuming functions by adjusting one or more of an operation schedule, an operation delay, an operation adjustment, and a selective deactivation of at least one of the one or more power consuming functions to reduce power consumption of the dishwasher in the energy savings mode. In order to reduce the peak energy consumed by the dishwasher 110, the controller 104 is configured to selectively adjust and/or disable at least one of the one or more power consuming features/functions to reduce power consumption of the dishwasher 110 in the energy savings mode. To this extent, the controller 104 is configured to reduce power levels in the energy savings mode. The controller 104 is also configured to reduce functions and/or reduce the intensity of functions in the energy savings mode.

It is to be appreciated that energy savings mode can be accomplished by adjusting operation functions/features during on peak demand periods, delaying or rescheduling operations to an off peak demand period, and through a combination of both adjustment of operations and rescheduling to off peak demands. Off peak demand periods correspond to periods during which lower cost energy is being supplied by the utility relative to peak demand periods during identifiable periods.

Changing the start of an appliance operation can be through a delay in start time or a rescheduling to a particular time period. Operational delays include one or more of a delay in start time, an extension of time to the delayed start, stopping an existing cycle and delaying a restart, finishing an existing cycle and delaying a restart (or start of subsequent cycle), and stopping after more than one cycle and delaying a restart. The stopping after more than one cycle can comprise advancing through one or more cycles until a logical stop is reached and then delaying any further operations until off-peak mode hours. The logical stop can include before a main wash, before a rinse phase, and/or before a dry cycle. In this manner, operations can either be delayed before they are initiated and/or they can be stopped after they have been initiated and restarted at a later time. For some functions, e.g., a wash cycle, it may be advantageous to finish an existing wash cycle and delaying a start of any subsequent cycles to an off peak demand period. In still other circumstances, a wash cycle followed by a rinse cycle may be advantageously programmed for completion and then the subsequent drying cycle delayed for an off peak demand period. In this manner, the dishwasher's cycles effectively operate "normally" but can be delayed wherein one or more of the cycles are stopped/delayed and restarted/started during a non-peak demand period.

Alternatively, or in conjunction with the above operational delays, an operational schedule can be initiated wherein a user interface gives a user the ability to select which of the one or more dishwasher functions are to be scheduled by the dishwasher control system at non-peak mode hours. Additionally, the dishwasher control system can receive a zip code entry which corresponds to a time of use schedule of a utility company from which the dishwasher control system can determine on-peak mode hours and off-peak mode hours. The information can use a time versus day of the week schedule input method that receives a cost, or price, per kilowatt hour signal directly from the utility advising of the current costs and schedules activation of the dishwasher to off-peak mode hours.

A control method in accordance with the present disclosure comprises determining the state of the utility, e.g., if it is operating in a peak demand period or an off-peak demand period, operating the dishwasher in a normal mode during the off-peak demand period, operating the dishwasher in an energy savings mode during the peak (or off-peak) demand period, scheduling, delaying, adjusting and/or selectively deactivating any number of one or more power consuming features/functions of the dishwasher to reduce power consumption of the dishwasher in the energy savings mode, and returning to the normal mode after the peak demand period is over. Off peak demand periods correspond to periods during which lower cost energy is being supplied by the utility relative to peak demand periods.

In conjunction with the scheduling delays described above, or as separate operational changes, the following operation adjustments can be selected in order to reduce energy demands. The operation adjustments to be described hereinafter, can be implemented in conjunction with off-peak mode hours and/or can be implemented during on-peak mode hours. Associated with a dishwasher, the operational adjustments can include one or more of the following: a reduction in operating temperature (i.e. temperature set point adjustments) in one or more cycles, a disablement of one or more heaters in one or more cycles, reduction in power to one or more heaters, a switch from a selected cycle to a reduced power consumption cycle, a reduction in a duration of cycle time in one or more cycles, a disablement of one or more cycles, a skipping of one or more cycles, a reduction of water volume and/or water temperature in one or more cycles, and an adjustment to wash additives (i.e. detergent, water softener, rinse agents, drying agents, etc.) in one or more cycles. Illustratively, a switch from a selected cycle to a reduced power consumption cycle could include a change to the cycle definition when a command is received. For example, if a customer/user selects a pot scrubbing cycle which uses more energy than a normal cycle the selected cycle would then switch to a "normal" cycle, or the customer/user selects the "normal" cycle which would then switch to a "light" cycle which uses less energy than the normal cycle. As described, the switching is in response to lowering the energy demands from a selected cycle to a reduced power consumption cycle that performs a generally similar function.

Figure 2:
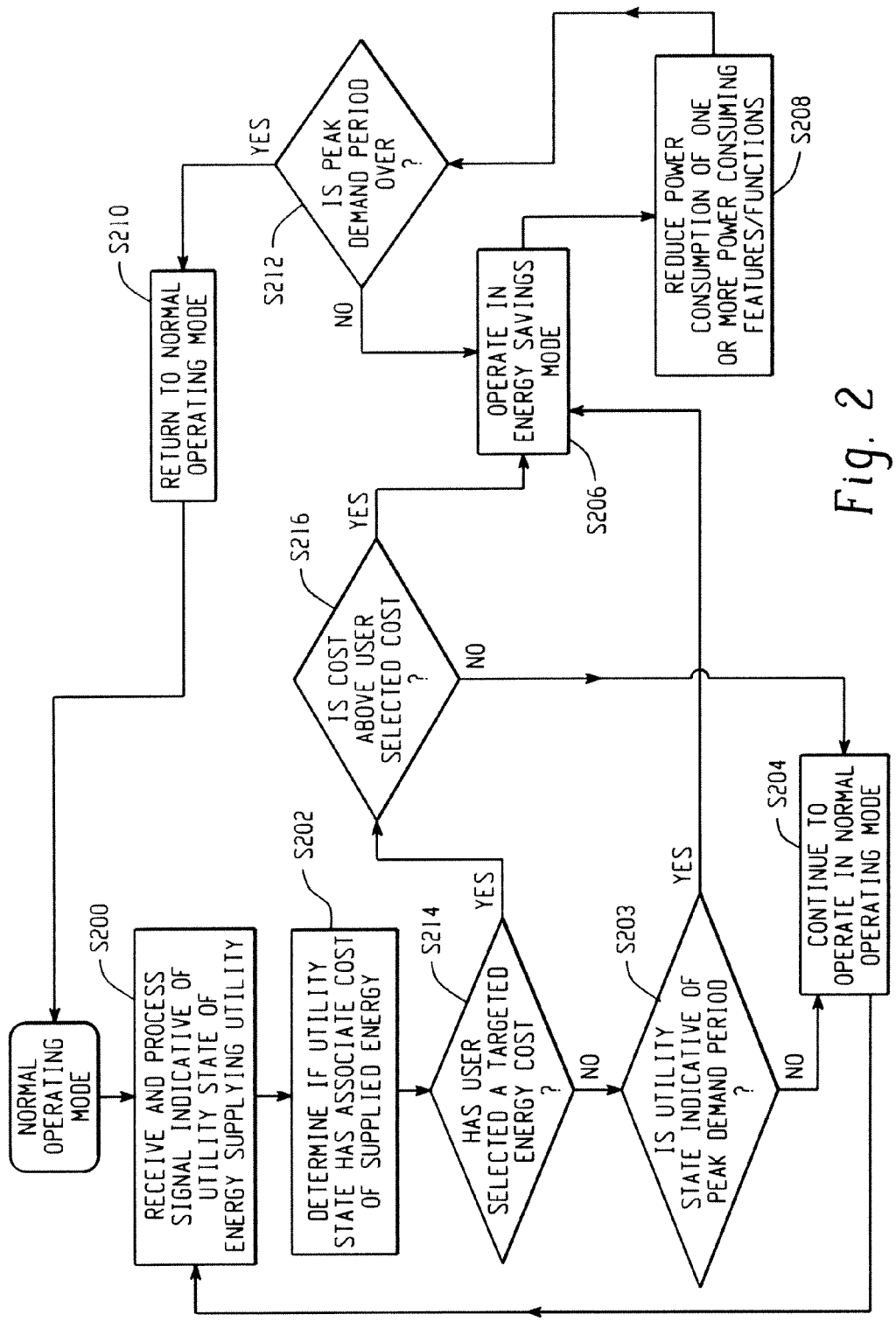
FIG. 2 is an exemplary operational flow chart for the dishwasher of FIG. 1.

With reference to FIG. 2, a control method in accordance with the present disclosure comprises communicating with an associated utility and receiving and processing the signal indicative of the operating state of the utility (S200), the utility state being indicative of at least a peak demand period or an off-peak demand period, determining if the state has an associated cost of supplying energy from the associated utility (S202), determine if the utility state is a peak demand period (S203), operating the dishwasher 110 in a normal mode during the off-peak demand period (S204), operating the dishwasher 110 in an energy savings mode during the peak demand period (S206), selectively adjusting any number of one or more power consuming features/functions 102 of the dishwasher to reduce power consumption of the appliance in the energy savings mode (S208), and returning to the normal mode (S210) after the peak demand period is over (S212). The selective adjustment can include reducing power in the energy savings mode, for example, selecting one or more of the operational adjustments described above.

It is to be appreciated that a selectable override option can be provided on the user interface 116 providing a user the ability to select which of the one or more power consuming features/functions are adjusted by the controller in the energy savings mode. The user can override any adjustments, whether time related or function related, to any of the power consuming functions. The override option can be initiated at any time or can be initiated based on a certain $/kilowatt hour. For the method outlined in FIG. 2, if the utility state has an associated energy cost (S202), the user can select a targeted energy cost (S214) and can base operation of the appliance on the selected targeted energy cost. If the current cost of energy is above the user selected cost (S216), then energy savings mode (S206) is initiated. If the current cost of energy is below the user selected cost, then the appliance continues to operate in normal mode (S204). The operational adjustments, particularly an energy savings operation can be accompanied by a display on the panel which communicates an activation of the energy savings mode. The energy savings mode display can include a display on the appliance display panel 118 of acronyms or more detailed messages in cases where the display has sufficient characters available. Additionally, an audible signal can be provided to alert the user of the appliance operating in the energy savings mode.

The duration of time that the dishwasher 110 operates in the energy savings mode may be determined by information in the energy signal 106. For example, the energy signal 106 may inform the dishwasher 110 to operate in the energy savings mode for a few minutes or for one hour, at which time the dishwasher returns to normal operation. Alternatively, the energy signal 106 may be continuously transmitted by the utility provider, or other signal generating system, as long as it is determined that instantaneous load reduction is necessary. Once transmission of the signal 106 has ceased, the dishwasher 110 returns to normal operating mode. In yet another embodiment, an energy signal may be transmitted to the dishwasher to signal the dishwasher to operate in the energy savings mode. A normal operation signal may then be later transmitted to the dishwasher to signal the appliance to return to the normal operating mode.

Figure 3:
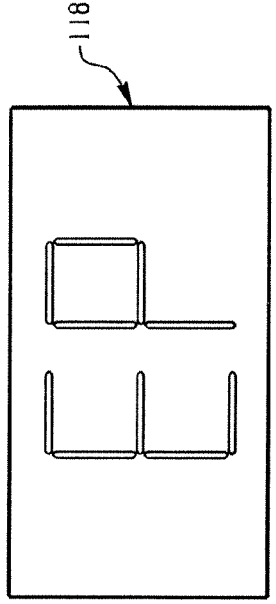
FIG. 3 is an exemplary control response for the dishwasher of FIG. 1.

The operation of the dishwasher 110 may vary as a function of a characteristic of the supplied energy, e.g., availability and/or price. Because some energy suppliers offer what is known as time-of-day pricing in their tariffs, price points could be tied directly to the tariff structure for the energy supplier. If real time pricing is offered by the energy supplier serving the site, this variance could be utilized to generate savings and reduce chain demand. Another load management program offered by energy supplier utilizes price tiers which the utility manages dynamically to reflect the total cost of energy delivery to its customers. These tiers provide the customer a relative indicator of the price of energy and are usually defined as being LOW (level 1), MEDIUM (level 2), HIGH (level 3), and CRITICAL (level 4). These tiers are shown in the chart of FIG. 3 to partially illustrate operation of the dishwasher 110 in each pricing tier. In the illustrative embodiment the appliance control response to the LOW and MEDIUM tiers is the same namely the appliance remains in the normal operating mode. Likewise the response to the HIGH and CRITICAL tiers is the same, namely operating the appliance in the energy saving mode. However, it will be appreciated that the controller could be configured to implement a unique operating mode for each tier which provides a desired balance between compromised performance and cost savings/energy savings. If the utility offers more than two rate/cost conditions, different combinations of energy saving control steps may be programmed to provide satisfactory cost savings/performance tradeoff. The operational and functional adjustments described above, and others, can be initiated and/or dependent upon the tiers. For example, a dishwasher sanitize cycle, and/or other functions, can be prevented or 'blocked' from activating if the pricing tier is at level 3 or 4. The display 118 can include a communication, for example, an audible and visual alert of pricing tier 3 and 4. Some communication line with the utility can be established including, but not limited to, the communication arrangements hereinbefore described. In addition, the display 118 can provide the actual cost of running the dishwasher in the selected mode of operation, as well as, maintain a running display of the present cost of energy. If the utility offers more than two rate/cost conditions, different combinations of energy saving control steps may be programmed to provide satisfactory cost savings/performance tradeoff.

As noted in the Background, most dishwashers include an automatic hot start feature that is included at the beginning of the first washing operation, which is typically a pre-wash cycle. The concept is intended to assure that the water temperature is sufficiently elevated to provide for an immediate and effective wash performance. Since there is the potential that water between the water heater and the inlet to the wash chamber of the dishwasher is at a cooler temperature than desired, the automatic hot start feature senses the water temperature at its inlet for the prewash cycle. If the temperature is insufficient, the water is drained, and the wash chamber refilled. This can occur up to three times which would likely assure that water from the water heater has reached the wash chamber.

Figure 4:
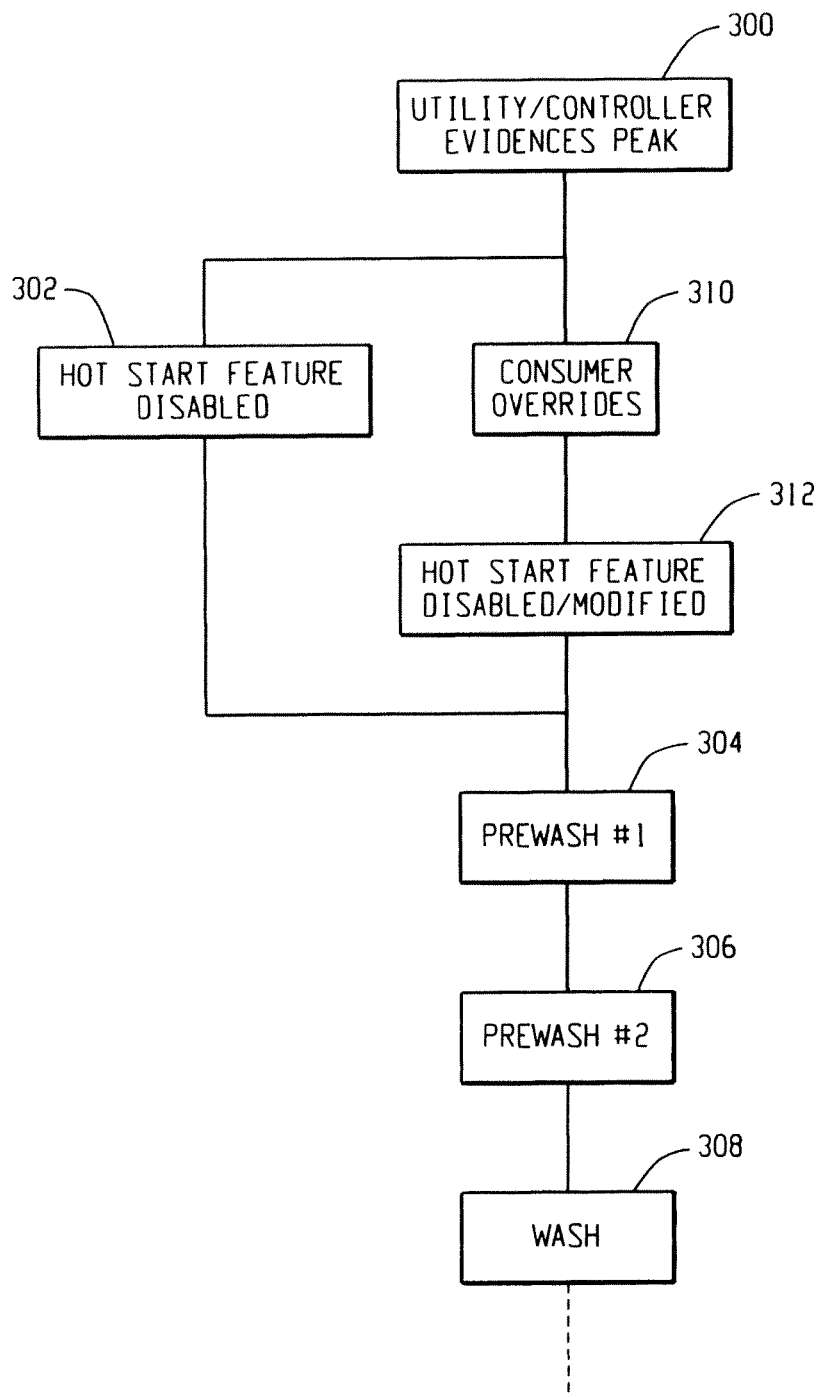
FIG. 4 is another operational flow chart for the dishwasher of FIG. 1.

As described previously, the consumer or homeowner has the option to override any suggested energy savings mode in response to a peak demand period. One typical manner of reducing energy costs with a dishwasher would be to modify the prewash cycle(s), and more particularly to modify the hot start feature associated with the first prewash. Thus, if the controller has received an indication of a peak demand period and the need to consider an energy savings mode, and the consumer chooses to override the energy savings mode, the controller in the dishwasher may be programmed to undertake a modification or disabling of the hot start feature. Alternatively, if the consumer has not indicated a desire to override the energy savings mode (and the wash cycle has not been delayed or was already started when the energy savings mode signal is received), the controller then disables or modifies the hot start feature and the wash cycle proceeds through the first prewash, and through subsequent cycles in the overall wash cycle. For example, as shown in FIG. 4, the utility or controller receives and/or processes a signal indicative of the peak demand period in step 300. The controller in step 302 modifies or disables the hot start feature. Likewise, even if the homeowner overrides the peak demand (step 310) suggestion of entering an energy savings mode for the dishwasher (e.g., delaying operation of the dishwasher), the controller will still disable or modify the hot start feature (step 312). For example, the hot start mode is changed such that no repeated fill and drain will be required for the first prewash cycle. Rather, the initial fill of water introduced into the wash chamber will be used for the first prewash cycle 304. In this scenario, the remainder of the wash cycle may follow an energy savings mode operation of the dishwasher so that, even though the second prewash cycle 306 and wash cycle 308, etc. are shown in the flow chart of FIG. 4, it will be understood that one or more of these steps may be modified if the homeowner has selected to follow the energy savings mode based on the received peak demand signal. That is, one or more of the wash cycles may be delayed, or other operations altered in one or more of the manners as described above.

Thus, if the homeowner elects to override the energy savings mode associated with dishwasher operation in response to the peak demand signal as shown at step 310, the controller is programmed to disable or modify the hot start feature at step 312 prior to entering the first prewash 304. Again, modification of the hot start feature may be as simple as reducing the temperature required in the hot start feature. This modification could result in a reduced number of fills, and may only require the initial fill. Of course, still other modifications could be considered either at the water heater, or the dishwasher to implement energy and associated cost saving features.

Figure 5:
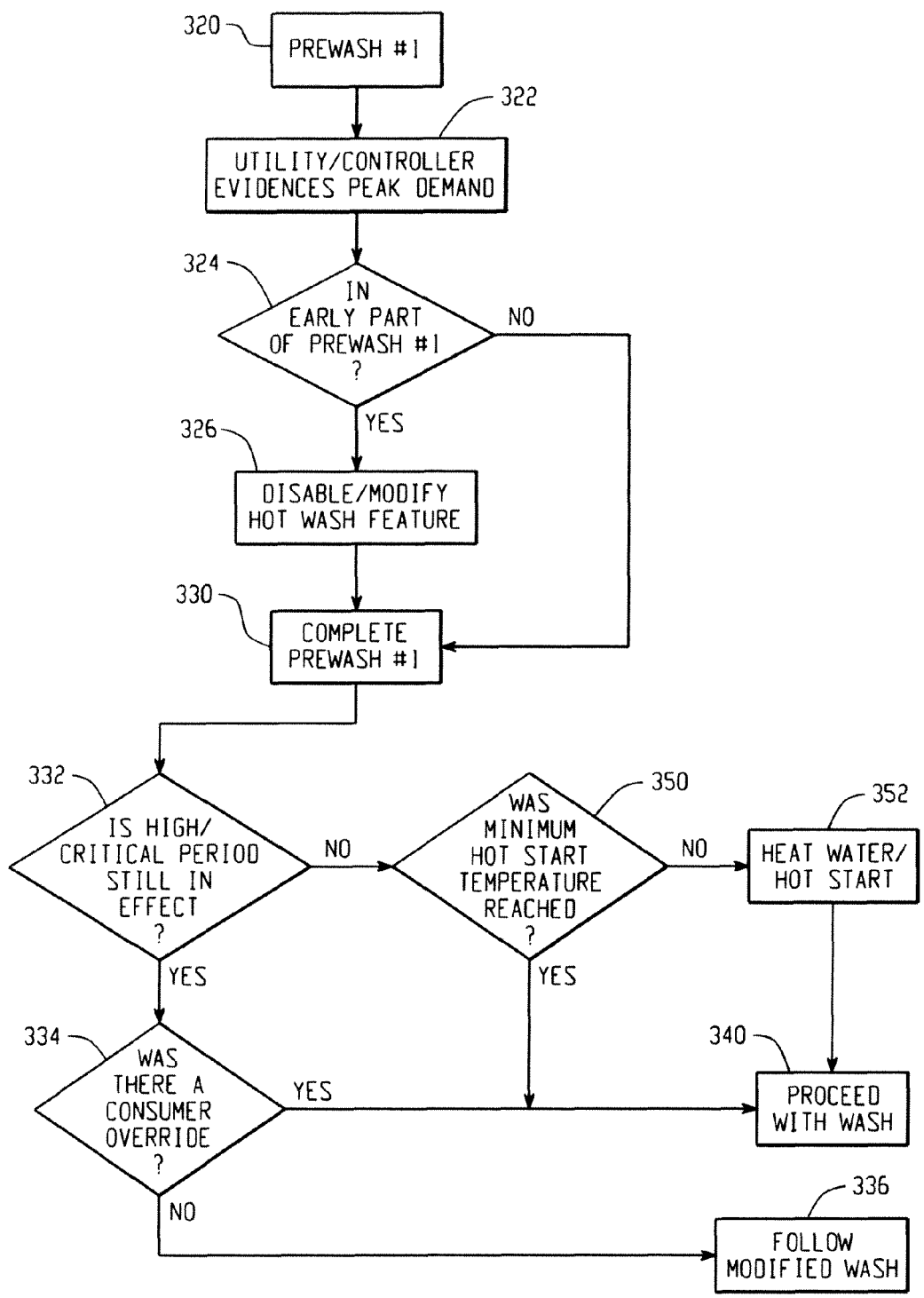
FIG. 5 is still another operational flow chart for the dishwasher of FIG. 1.

FIG. 5 exemplifies a situation where the homeowner has already begun operation of the dishwasher and the dishwasher is in the first prewash cycle 320 when the utility or controller signal evidencing peak demand at 322 is received. The flow chart of FIG. 5 indicates that the controller makes a determination of whether the first prewash cycle is in the early stage of its cycle (decision step 324). If it is, then the controller will disable or modify the hot start feature as represented in step 326. If the first prewash cycle is substantially underway, then the controller directs operation to complete the first prewash as shown in step 330. Once the first prewash is complete, a decision step 332 determines whether the high or critical peak demand period is still in effect. If the answer is yes, the subsequent decision as shown in 334 determines whether or not the homeowner has decided to override an energy savings mode operation of the dishwasher. If there is no homeowner override, then the dishwasher will proceed through the energy savings mode of a modified wash cycle as represented by step 336. On the other hand, if a homeowner override was implemented, then the controller will direct operation of the dishwasher through the remainder of the wash cycle as evidenced at step 340.

Similarly, if the high or critical period is no longer in effect, a second decision step 350 is encountered to determine whether a minimum hot start temperature has been reached. If the hot start temperature has been reached, then the controller directs operation of the dishwasher to proceed with the normal wash operation at step 340. On the other hand, if the minimum hot start temperature has not been reached, the controller directs operation of the dishwasher to step 352 where the water is heated or the hot start feature is enabled (i.e., the wash chamber is drained, and a second and/or third fill operation undertaken) before proceeding with the remainder of the wash cycle in step 340.

Consequently, since many dishwashers have or will have an auto hot start feature that automatically occurs at the beginning of a wash cycle if the incoming water temperature is not hot enough to aid in wash performance, the controller will automatically re-run the first fill if the water temperature does not exceed a predetermined temperature limit. The controller will then check the water temperature again to see if the incoming water meets the temperature requirement. The controller will repeat this process up to three times in an effort to purge the incoming hot water line of cold water. This is particularly evident in homes where the water line from the water heater to the dishwasher is very long. By disabling the auto hot start feature in a high or critical rate period, for example, the user will save on water and energy usage from the water heater during these rate periods. Thus, other demand supply responses such as delay, etc. would still be used, but if the homeowner elects to override the energy savings mode, then the auto hot start feature will not be performed. Instead, the wash chamber will simply fill one time for the first prewash and the circulated water will heat for a desired time or as needed, and then move to the next portion of the wash cycle. In other words, the auto hot start feature is associated with the beginning of a wash cycle and can be disabled or altered when the peak demand period is encountered. Operation of the dishwasher can be modified before the first prewash cycle or even during the prewash cycle in an effort to gain some energy savings.

In connection with the hot start feature, temperature is typically sensed throughout the time period because a typical first prewash has the heater on. That is, a running average of the temperature is obtained in an effort to determine whether the target temperature (e.g., 80° F.) has been reached.

The disclosure has been described with reference to the preferred embodiments. Obviously, modifications and alterations will occur to others upon reading and understanding the preceding detailed description. It is intended that the invention be construed as including all such modifications and alterations.

What is claimed is:

1. A method of controlling a dishwasher, said method comprising:
   receiving a signal indicative of a peak demand period; and
   modifying a hot start feature of a wash cycle in response to a peak demand period signal so that no repeated fill and drain is required for a prewash of the wash cycle.

2. The method of claim 1 wherein the modifying step includes disabling the hot start feature.

3. The method of claim 1 wherein the modifying step is operative in response to a homeowner electing to override the peak demand period signal.

4. The method of claim 1 wherein the modifying step is inoperative in the absence of a homeowner overriding the peak demand period signal.

5. The method of claim 4 wherein the hot start feature modifying step is only responsive to receipt of the peak demand period signal before the beginning of the wash cycle.

6. The method of claim 1 wherein the hot start feature modifying step is responsive to receipt of the peak demand period signal up to completion of the prewash of the wash cycle.

7. The method of claim 1 wherein the modifying step includes establishing a lower target temperature for the hot start feature.

8. The method of claim 1 wherein the hot start feature includes providing prewash water to the dishwasher, monitoring a temperature of the prewash water, and draining the prewash water from the dishwasher if the temperature of the prewash water does not reach a target temperature.

* * * * *

UNITED STATES PATENT AND TRADEMARK OFFICE
CERTIFICATE OF CORRECTION

| | | |
|---|---|---|
| PATENT NO. | : 8,801,862 B2 | Page 1 of 1 |
| APPLICATION NO. | : 12/891070 | |
| DATED | : August 12, 2014 | |
| INVENTOR(S) | : Graven | |

It is certified that error appears in the above-identified patent and that said Letters Patent is hereby corrected as shown below:

In the Claims

In Column 10, Line 43, in Claim 5, delete "claim 4" and insert -- claim 1 --, therefor.

Signed and Sealed this
Twenty-eighth Day of April, 2015

Michelle K. Lee
*Director of the United States Patent and Trademark Office*